(12) United States Patent
Boyce (10) Patent No.: US 9,043,904 B2
(45) Date of Patent: *May 26, 2015

(54) METHOD AND SYSTEM FOR DYNAMIC PROTOCOL DECODING AND ANALYSIS

(71) Applicant: Kevin Gerard Boyce, Chelsea (CA)

(72) Inventor: Kevin Gerard Boyce, Chelsea (CA)

(73) Assignee: TREND MICRO INCORPORATED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,894

(22) Filed: Aug. 7, 2013

(65) Prior Publication Data

US 2013/0326621 A1    Dec. 5, 2013

Related U.S. Application Data

(63) Continuation of application No. 12/117,218, filed on May 8, 2008, now Pat. No. 8,510,791.

(60) Provisional application No. 60/973,684, filed on Sep. 19, 2007.

(51) Int. Cl.
*H04L 29/06* (2006.01)
*G06F 21/55* (2013.01)

(52) U.S. Cl.
CPC ............ *H04L 63/1408* (2013.01); *G06F 21/55* (2013.01); *H04L 63/0245* (2013.01); *H04L 63/1416* (2013.01); *H04L 63/20* (2013.01)

(58) Field of Classification Search
CPC .................................................. H04L 63/1408
USPC .......................................................... 726/22
See application file for complete search history.

(56) References Cited

U.S. PATENT DOCUMENTS

| | | | |
|---|---|---|---|
| 5,916,305 A | 6/1999 | Sikdar et al. | |
| 6,564,265 B2 * | 5/2003 | Tillmann et al. | 709/246 |
| 6,971,058 B2 * | 11/2005 | Evans et al. | 714/807 |
| 7,257,833 B1 | 8/2007 | Parekh et al. | |
| 7,443,872 B1 * | 10/2008 | Corbett et al. | 370/431 |
| 7,610,375 B2 * | 10/2009 | Portolani et al. | 709/224 |
| 2003/0058872 A1 * | 3/2003 | Berggreen et al. | 370/401 |
| 2003/0177252 A1 * | 9/2003 | Krichevski et al. | 709/230 |
| 2008/0133518 A1 | 6/2008 | Kapoor et al. | |
| 2009/0313373 A1 | 12/2009 | Hanna et al. | |

FOREIGN PATENT DOCUMENTS

WO    2007/099497    9/2007

OTHER PUBLICATIONS

Domain Names—Implementation and Specification, Request for Comments (RFC) 1035, M. Mockapetris, published by IEFT (Internet Engineering Task Force), Nov. 1987.
GZIP file format specification version 4.3, Request for Comments (RFC) 1952, P. Deutsch, published by IEFT (Internet Engineering Task Force), May 1996.

* cited by examiner

*Primary Examiner* — Peter Shaw
(74) *Attorney, Agent, or Firm* — Victoria Donnelly; IP-MEX Inc.

(57) ABSTRACT

A method for dynamically decoding protocol data on a computer system is provided using a protocol decoder, which inspects and analyzes protocol data received by the computer system. A protocol decoding program controls the decoding and analysis process. The method may be used by an intrusion prevention system to identify anomalous protocol data that may cause harm to applications receiving the data.

22 Claims, 7 Drawing Sheets

METHOD AND SYSTEM FOR DYNAMIC PROTOCOL DECODING AND ANALYSIS

RELATED APPLICATIONS

The present application is a Continuation application of U.S. application Ser. No. 12/117,218 filed on May 8, 2008, which is to be issued as a U.S. Pat. No. 8,510,791 on Aug. 13, 2013, which claims benefit to the U.S. provisional application Ser. No. 60/973,684 filed on Sep. 19, 2007 entitled "DYNAMIC PROTOCOL DECODING", the entire contents of all applications and issued patent being incorporated herein by reference.

FIELD OF THE INVENTION

The present invention relates to computer security systems, and in particular to an improved method and system for dynamic protocol decoding and analysis.

BACKGROUND OF THE INVENTION

The Internet has become a place over which unwanted, potentially harmful, and otherwise unsolicited data traffic is transmitted. Since complex computer systems and networks may not always be configured securely, and the installed software on computer systems often contains software defects and other vulnerabilities, they have become a target for intruders seeking to obtain unauthorized access or even outright control of a computer system.

This phenomenon has given rise to an industry providing various tools for "defending" networks, servers and computer workstations against such traffic, while allowing legitimate traffic to pass unhindered. A "firewall" is typically software that is installed in a network node; traffic passing through a firewall is inspected by first intercepting each packet and applying a set of rules to determine whether the packet should pass or be stopped. A firewall may be implemented in a networked computer such as a server or a workstation, as well as in dedicated nodes such as network access nodes and routers.

The functionality of a firewall may range from simple address filtering in which packets with predetermined source addresses or ranges of addresses are discarded, to more complex processes, which include: discriminating traffic on the basis of the protocol, for example ICMP (Internet Control Message Protocol), UDP (User Datagram Protocol), TCP (Transmission Control Protocol), etc; filtering based on source and destination ports of each packet; tracking the connection state to determine protocol violations; and the like. If needed, more sophisticated filtering may be done on the basis of the message content itself, so called "deep" packet inspection.

Intruders may attempt to transmit one or more specially crafted network packets designed to exploit a computer system vulnerability. A buffer overflow attack, for example, can create a condition where data is stored beyond the boundaries of a memory buffer, and adjacent memory locations are overwritten. This attack may be attempted using a network packet which is designed to exploit a flaw in the memory allocation strategy in the receiving computer system. The intruder may be able to cause the computer system to behave in an unintended way, or even run malicious code transmitted by the intruder.

In prior art firewall or intrusion detection systems, network packets may be inspected for predefined data patterns, with the goal of identifying anomalous network traffic, which may have been crafted by an intruder. This traffic could then be discarded by the firewall to prevent an attack, for example, before it would be processed by vulnerable computer software. This approach alone is inadequate, since intruders may be able to design an alternate form of the attack which has the desired effect without containing the data pattern the firewall is looking for. Depending on the protocol, the attacker may also be able to encode the network traffic so that the desired payload is carried in a way which evades firewall detection. Further, the firewall may find occurrences of the predefined data patterns which are contained in legitimate network traffic (so called "false positives").

In some protocols, entire classes of attack types cannot be detected by prior art intrusion detection systems that use a simple search for a predefined data pattern. For example, it is common for compression or encoding schemes to be used to reduce the bandwidth required to transmit information in some protocols. In the DNS (Domain Name System), for example, domain names may be compressed using a specialized scheme described in Request for Comments (RFC) 1035 of Internet Engineering Task Force (IETF) written by P Mockapetris entitled "Domain Names—Implementation and Specification", November 1987. A simple search for a data pattern which may be indicative of malicious network traffic may not succeed when traffic is compressed or encoded. As yet another example, in HTTP (Hypertext Transfer Protocol), GNU Zip compression as described in RFC1952 of Network Working Group of IETF, written by Peter Deutsch entitled "GZIP file format specification version 4.3", May 1996, may be applied to content before transmission. Other content encodings and compression techniques in HTTP and many other protocols are also possible.

To formally specify the formats and data structures used in various protocols, a number of languages have been developed, including ASN.1 (Abstract Syntax Notation One) and IDL (Interface Definition Language). These languages are typically used to precisely describe the syntax of various protocol data units (PDUs) in a way that is independent of the software language used to process the PDUs for transmission or reception. Such "definition languages" are suitable for defining protocol interfaces, but they are not "computer languages" such as C, C++, or Java and they do not contain the constructs necessary for writing an actual computer program.

Accordingly, there is a need for an improved method and system for dynamic protocol decoding and analysis, to allow the detection and prevention of malicious traffic that overcomes the drawbacks of the prior art.

SUMMARY OF THE INVENTION

There is an object of the invention to provide an improved method and system for dynamic protocol decoding and analysis for inspecting a data stream on a computer system in a computer network.

According to one aspect of the invention, there is provided a method for dynamic protocol decoding, comprising the steps of:
  obtaining a protocol decoding program, comprising a plurality of rules and associated rule instructions, and a plurality of protocol decoding instructions;
  analyzing a data packet according to the protocol decoding program by executing at least a portion of the protocol instructions;
  triggering at least one of the rules in said protocol decoding program based on the results of the analyzing step; and
  executing at least one rule instruction associated with the at least one of the rules.

Beneficially, the at least one rule instruction comprises one or more of the following: terminating a network connection on which the packet has been received; changing the data packet; logging a message; and logging at least a portion of the data packet.

Advantageously, the analyzing step comprises:
generating an exception according to an exception handling mechanism; and
triggering a rule based on the exception.

Advantageously, the analyzing step comprises:
terminating the analyzing step when a decoded length is exceeded according to a limit mechanism.

The step of triggering comprises:
scanning at least a portion of the data packet for a data pattern; and
triggering a rule when the pattern is found.

Conveniently, the step of triggering comprises:
scanning at least a portion of the data packet; and
triggering a counter rule when a threshold value is reached According to another aspect of the invention, there is provided a method for inspecting a data stream on a computer system in a computer network, comprising the steps of:
(a) obtaining a protocol decoding program, comprising a plurality of rules and associated rule instructions, and a plurality of protocol decoding instructions;
(b) receiving a data stream comprising a plurality of data packets from the computer network;
(c) detecting at least a portion of the data stream which is encoded according to an encoding method;
(d) decoding the encoded portion of the data stream into a decoded data stream;
(e) scanning said decoded data stream for at least one data pattern;
(f) triggering one or more of the rules in said protocol decoding program based on the results of said scanning step; and
(g) executing at least one rule instruction associated with the rule.

Beneficially, the at least one rule instruction comprises one or more of the following: terminating a network connection; changing the data packet; logging a message; and logging at least a portion of the data packet.

In one embodiment of the invention, the encoding method is a data compression method.

In the method described above, the at least one rule instruction comprises changing contents of the data packet, and further comprising the step of forwarding the changed data packet.

Advantageously, the decoding step comprises:
generating an exception according to an exception handling mechanism; and
triggering a rule based on the exception.

Advantageously, the decoding step comprises:
terminating the decoding step when a decoded length is exceeded according to a limit mechanism.

According to yet another aspect of the invention, there is provided a computer system in a computer network, comprising:
protocol decoding means for decoding protocol data received by the computer system from a computer network;
limit means and exception handling means for controlling the execution of the protocol decoding means;
scanning means for scanning decoded data produced by the protocol decoding means; and
rule evaluation means for evaluating protocol decoding rules and executing rule instructions associated with said protocol decoding rules.

According to one more aspect of the invention, there is provided a computer system in a computer network, comprising:
protocol decoding means for decoding protocol data received by the computer system from a computer network;
layered protocol decoding means for decoding encoded protocol data received by the protocol decoding means;
limit means and exception handling means for controlling the execution of the protocol decoding means;
scanning means for scanning decoded data produced by the protocol decoding means or the layered protocol decoding means; and
rule evaluation means for evaluating protocol decoding rules and executing rule instructions associated with said protocol decoding rules.

The computer system described above further comprises network control means for selectively terminating a network connection, the network control means operating in communication with said rule evaluation means.

According to one more aspect of the invention, there is provided a system for dynamic protocol decoding on a computer system in a computer network, the system comprising:
a memory, comprising:
a protocol decoding program code stored in the memory for decoding data packets received by the computer system from the computer network, said protocol decoding program comprising an instruction that, when executed, terminates an active connection between the computer system and the computer network;
a state machine module stored in the memory for executing the protocol decoding program, said state machine comprising memory storage that is manipulated by the state machine according to the protocol decoding program; and
a rule evaluation module stored in the memory for executing rule instructions associated with rules triggered by the state machine.

Beneficially, the rule instructions comprise one or more instructions that, when executed by the state machine, change the contents of a data packet and forward the changed data packet.

The state machine module further comprises an exception handling module, and wherein the protocol decoding program further comprises one or more instructions that, when executed, trigger a rule when an exception is generated by the exception handling module.

Beneficially, the protocol decoding program comprises one or more instructions that, when executed by the state machine, terminate a decoding step of the protocol decoding program when a decoded length is exceeded according to a limit mechanism.

According to yet another aspect of the invention, there is provided a protocol decoding apparatus for a computer system in a computer network, the apparatus comprising:
a protocol decoding module, for decoding data packets received by the computer system from the computer network;
a pattern matching module, for searching decoded data packets from the protocol decoding module for a plurality of data patterns; and a rule evaluation module, for executing rule instructions associated with rules triggered by the protocol decoding module or the pattern matching module.

The apparatus described above comprises a payload editing module, for selectively changing the data packets.

A computer readable medium comprising computer code instructions stored thereon, which when executed by a computer, perform the steps of the methods described above is also provided.

The computer system of the embodiments of the invention comprises a computer having a processor and a memory, storing computer code instructions, which, when executed, perform the steps of the methods described above. Subsets of the computer code instructions stored in the memory form respective modules and means of the computer system, which provide corresponding functionality for the system as described in detail in the section "detailed description of the embodiments of the invention" below.

DETAILED DESCRIPTION OF THE EMBODIMENTS OF THE INVENTION

General Description

One form of software security architecture for an IPS ("Intrusion Prevention System") or IDS ("Intrusion Detection System") according to the embodiments of the present invention includes three main components, namely "Security Center", "Deep Security Manager (DSM)", and "Agent", wherein:

"Security Center" is the server where IPS Filters, Detection Rules and Expressions are defined;

"DSM" is the server portion that runs within an enterprise to communicate to the Security Center to receive updates, run the Recommendation Engine, query the Agents, and distribute security configuration to the Agents; and "Agent" is the software that performs the IPS/IDS operations on the computer system.

The method and system for dynamic protocol decoding according to the embodiments of the invention rely on the following software components that have been developed for implementing the embodiments of the invention:

A protocol decoding language, which is used to create programs that can decode data structures and make decisions based on their content and structure. Protocol decoding programs defined using this language are suitable for use by the Agent software. Preferably, the language is processed so that protocol decoding programs can be added or replaced without requiring the restart or interruption of the computer system on which traffic is being inspected and analyzed; and An execution environment comprising a state machine, which operates according to the protocol decoding program and provides support procedures to enable decoding of data structures and protocols, and comprising memory storage and other working variables that are manipulated by the state machine according to the program being executed.

The protocol decoding language and the execution environment are used to define and run protocol decoding programs that analyze network traffic and conditionally take specific actions according to defined rules. These actions may include making a log entry for an administrator of the computer system to review at a later time, or a real-time action such as terminating or resetting a network connection, or modifying a received data packet before any subsequent processing on the packet is performed.

The protocol decoding language may be used as part of an intrusion detection system to analyze data received from a network, and take appropriate actions when anomalies are discovered in the data that may cause harm to the ultimate receiver of that data.

DESCRIPTION OF THE EMBODIMENTS OF THE INVENTION

Figure 1:
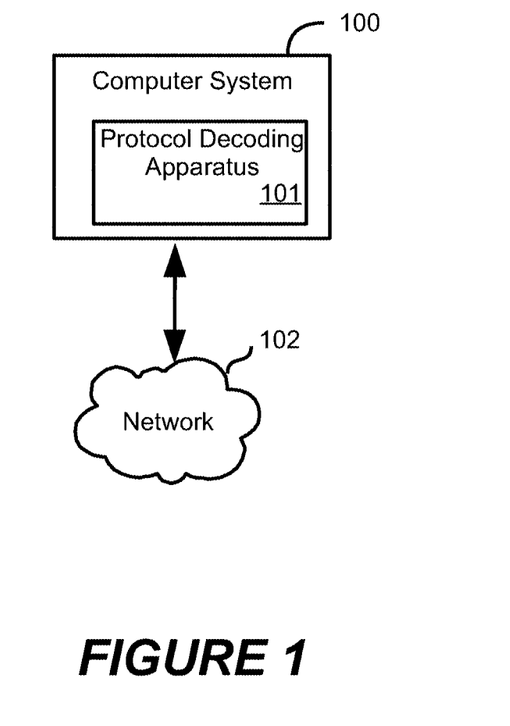
FIG. 1 shows a computer system according to an embodiment of the present invention in a network environment.

With reference to the diagrams, FIG. 1 shows the Computer System 100 according to an embodiment of the present invention in a network environment. While a single computer network is shown here, it should be apparent that any number of computer networks may be interconnected to the Computer System 100. The Computer System 100 comprises Protocol Decoding Apparatus 101, which performs the protocol decoding and analysis functions on the data packets carried over Network 102. Preferably, both received and transmitted data packets are processed by Protocol Decoding Apparatus 102.

Figure 2:
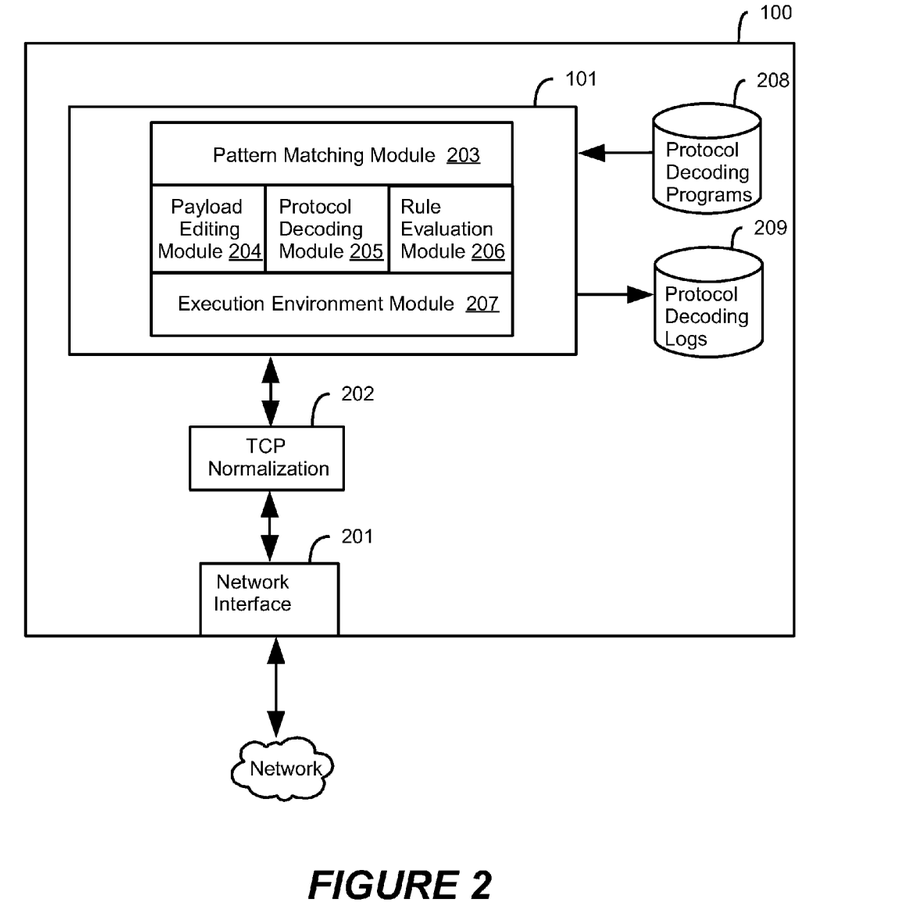
FIG. 2 shows an expanded block diagram of the Computer System 100, and functional components of the Protocol Decoding Apparatus 101 of FIG. 1.

FIG. 2 shows an expanded block diagram of the Computer System 100, and functional components of the Protocol Decoding Apparatus 101 of FIG. 1.

Protocol Decoding Apparatus 101 comprises:

Execution Environment Module 207, which provides the operating environment for executing protocol decoding programs. Execution Environment Module 207 is described in more detail in FIG. 3.

Payload Editing Module 204, which supports the ability for a program to edit or change packet content before it is passed to a receiving application.

Protocol Decoding Module 205, which performs the decoding and analysis functions according to the protocol decoding program. Protocol Decoding Module 205 is described in more detail in FIG. 4.

Rule Evaluation Module 206, which determines when a rule should be triggered. Rules are defined by patterns that are discovered in the data packets, or by events that are signaled by a protocol decoding program, or when counters in a program reach defined thresholds. A counter rule may be triggered automatically, for example, if a defined maximum length of a protocol element is exceeded.

Pattern Matching Module 203, which scans the data packets for a set or dictionary of string patterns. If a particular pattern matches to a data packet or a set of packets, then a pattern rule may be triggered. To perform the pattern matching function efficiently, preferably the methods disclosed in "Fast Identification of Complex Strings in a Data Stream" (TB-002) or "Conditional String Search" (TB-030) or other suitable methods are used.

The Computer System 100 including Protocol Decoding Apparatus 101 operates in the following manner. Data packets corresponding to a TCP (Transmission Control Protocol) connection are received from Network Interface 201. TCP Normalization 202 processes the data packets to ensure that subsequent analysis is performed on normalized data, in the same way the receiving application would see the data. As is known with TCP and other connection-oriented protocols, transmitted data may be received out of order, packets may be fragmented, and packets may be duplicated due to retransmission, etc. Without normalization, these aspects of TCP and other protocols may be exploited by an attacker in an attempt to evade detection, or generate false positives. Methods of normalization disclosed in the U.S. application Ser. No. 11/491,233 filed Jul. 24, 2006 entitled "TCP Normalization Engine" and published as US20070025374, or other normalization methods suitable for use in an intrusion detection system may be employed.

Normalized packets are then processed by Protocol Decoding Apparatus 101 to determine what actions, if any, should be performed based on the decoding and analysis steps executed.

Protocol Decoding Programs 208 are stored on a persistent storage medium and used by Protocol Decoding Apparatus 101. Preferably, the programs are expressed in a high level protocol decoding language, and have been compiled into a compiled code or a bytecode which can be efficiently executed.

By way of illustration, here is a brief example of a protocol decoding language fragment in an XML notation:

```
<type name="tuple">
    <int/>
    <store var="1"/> # store decoded integer in variable 1
    <int/>
    <add var="1"/>  # add decoded integer
</type>
```

This is an example for a "tuple" type consisting of a pair of 4 byte integers. Each <int/> is a concrete type, i.e., it represents actual data, in this case 4 bytes. The other elements are example of pseudo types, i.e., control elements, which do not represent real data. In this example, the pseudo types are used to insert semantic actions, which compute the sum of the two integers in the tuple and store this sum in a memory store variable. While the protocol decoding language example shown here is in an XML notation, any suitable language may be used.

Note that the pseudo types allow control mechanisms to be interspersed with the protocol description. Data types can be constructed with loops and contain other data types.

```
<type name="list">
    <while> <ne val="99"/> <do/>
    <struct name="tuple">
    </while>
```

This example illustrates how sequential or recursive types can be decoded. As a protection mechanism, it is an error for a loop to repeat if no concrete type was executed during the last iteration.

As well as loops, the language can be extended to include other useful control structures usually found in imperative languages, such as "if-then-else", "case", however this is not central to our invention.

It is also possible for multiple units of the machine to be arranged in sequence. This can be useful when dealing with layered protocols or protocol stacks, with each machine decoding one layer of the protocol stack.

The following pseudo types provide control structures that address some difficult decoding problems. These are:
    Setting limits; and
    Dealing with errors.

Limits

Many protocols use an encoding technique where the data unit is terminated by a trailing sentinel, such as a NUL character or space for example. This could be decoded using a simple loop, for example, decoding a word ending in an ASCII SPACE:

```
<byte/>
<while> <ne val="0x20"/> <do/>
    <byte/>
</while>
```

However, often these protocol fields have specified maximum bounds, and in other cases it is useful to place a reasonable maximum bound in order to be able to distinguish an invalid data unit or avoid a problem in a vulnerable application.

Although this loop condition can be extended to account for such a limit, it can become complex and error prone, especially if the loop contains types larger than one byte. It can be further complicated if such conditions become nested such as "maximum sentence length is 100 characters and maximum word with sentence is 10 bytes."

To reliably deal with such protocols a <limit> mechanism is introduced:

```
<limit len="100">
    <while> <do/>
    <limit len="10">
        <byte/>
        <while> <ne val="0x20"/> <do/>
            <byte/>
        </while>
    </limit>
    </while>
</limit>
```

The <limit> mechanism provides a structured way of dealing with this problem, which is more reliable than a manually programmed condition.

In the above case, the <limit> uses a constant value, and exceeding the limit is considered to be an error. Another common encoding method describes variable length data using a prefix length. The following data size is given by the decoded length. The <limit> mechanism is useful for this situation too; however in this case when the limit is reached it is not considered an error but the termination condition.

An error handling mechanism allows control over how <limit> conditions are managed.

Error Handling

During the protocol decoding it may be determined that the content being decoded does not meet the semantic constraints of the protocol, for example, an integer is out of a required range, or a header field is longer than a maximum length. In this case it can be complex to manage errors correctly and to recover from them. For some protocols it is possible to recover and continue at the next protocol element.

An exception handling mechanism provides a powerful way of reliably handling errors and recovering control especially in conjunction with the <limit> mechanism. In combination with the other control mechanisms described above, it provides an effective way to deal with and recover from errors:

```
<while> <do/>           # decode sequence of data structures
    <byte/>             # decode length field
    <try>
        <limit>         # limit to length
            <try>
                <bytescan "0">
                <bytescan "0">
                <int min="1" max="4"># possible constraint error
                <byte/>
                <int/>          # decode other fields
            <catch>         # handle constraint errors here
                <blob/>     # recover to start of next protocol unit
            </catch>
        </try>
        <blob/>         # trailing data
        </limit>
    </try>
</while>
```

Example Program Encoding

To illustrate how the type memory would be prepared to encode a program in the XML notation used previously, an encoding of a program fragment is shown. It should be noted that alternate text notations for describing the program can be conceived and be encoded into the same program:

```
<limit len="100">
    <while> <do/>
    <limit len="10">
    <while> <byte/> <ne val="0x20"/> <do/>
    </while>
    </limit>
</while>
```

Below is a summary of an exemplary type memory layout for the above program.

Type Memory Layout for Example Program

| Address | Type Code | Value (hex) | Note |
|---|---|---|---|
| 0 | 20 | 20 | LOADI 0x20 |
| 1 | 22 | 0 | MS[0] = 0x20 |
| 2 | 14 | 64 | limit 100 |
| 3 | 12 | 0C | While (BF) |
| 4 | 14 | 0B | Limit 10 |
| 5 | 01 | 0 | Byte |
| 6 | 24 | 0 | EQ MS[0] |
| 7 | 27 | 0 | NOT |
| 8 | 12 | 8 | While (BF) |
| 9 | 11 | 5 | End-while (repeat) |
| 0A | 15 | 2 | End-limit |
| 0B | 11 | 1 | End-while |
| 0C | 15 | 0 | End-limit (repeat) |
| 0D | 3F | 0 | Null |

During the decoding and analysis process, Rule Evaluation Module 206 may be used to trigger a defined rule. Preferably, rules are also defined in the protocol decoding language. As one example, a counter of length 1024 bytes may be started upon finding the pattern "GET". If the pattern "\r\n" is not encountered within 1024 bytes of "GET" then the text "Max line length exceeded" is logged and the connection is terminated using a "drop" command:

```
<rule pat="GET">startcount 1024</rule>
<counter>drop "Max line length exceeded"</counter>
<rule pat="\r\n">clrcount<rule>
```

Protocol Decoding Logs 209 is a persistent storage medium for log entries. Log entries may contain indications of the actions taken by protocol decoding programs, such as rules that were triggered, connections that were terminated because of suspicious data, fragments of data packets, or other entries. Log entries are typically reviewed by an Administrator of the Computer System 100.

Figure 3:
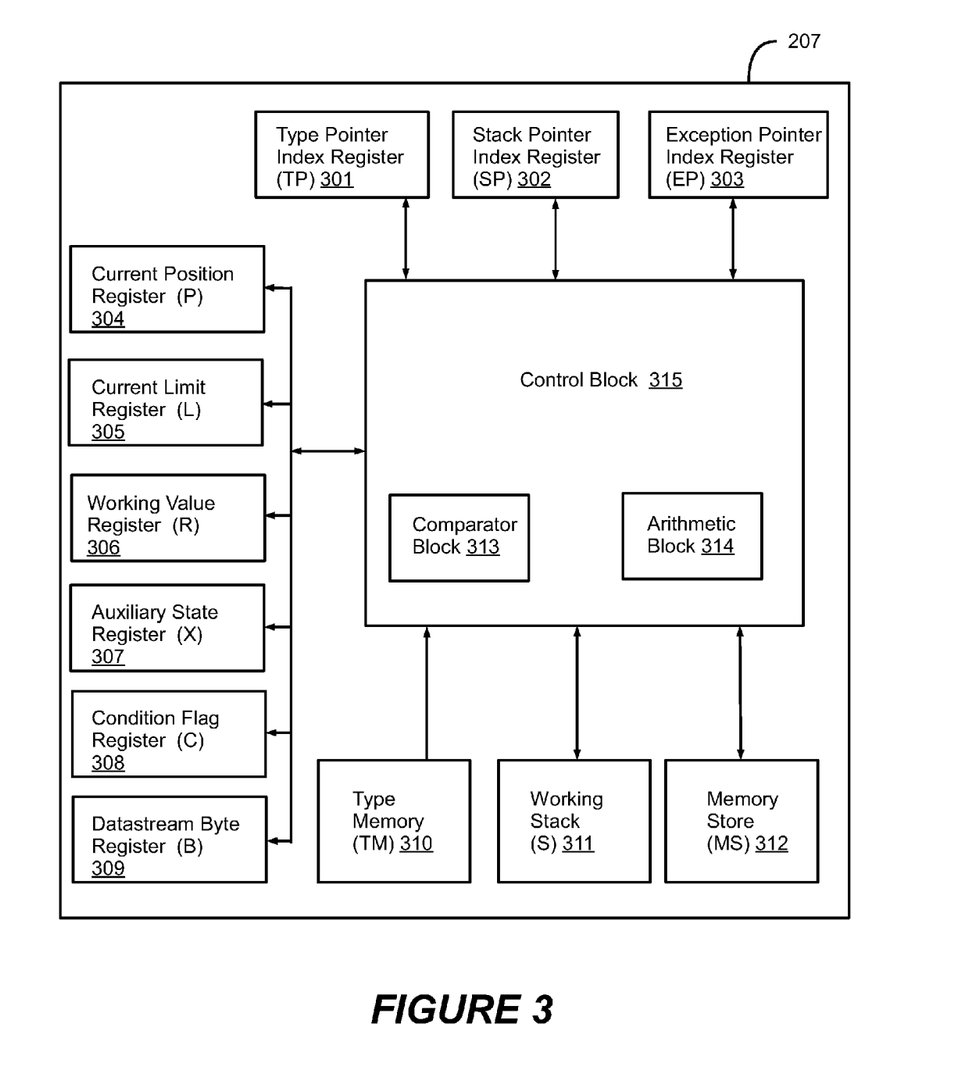
FIG. 3 shows an expanded block diagram of the Execution Environment Module 207 of FIG. 2.

FIG. 3 shows an expanded block diagram of the Execution Environment Module 207 of FIG. 2, comprising:
Control block 315, including Comparator block 313 and Arithmetic block 314;
Type Memory 310, which is an array of type instructions, each type instruction consisting of two parts, a type code and an operand;
Type Pointer index register 301, which is an index into the type memory;
Memory Store 312 which is an array of random access variables;
Working Stack 311 which is an array containing type addresses or positions;
Stack Pointer 302 which is an index into the top of the Working Stack 311;
Working Value register 306 which can hold an integer value;
Condition Flag register 308 which can be TRUE or FALSE;
Current Position register 304, which can hold a stream position (preferably an unsigned integer);
Current Limit register 305, which can hold a stream position (preferably an unsigned integer);
Auxiliary State register 307;
Datastream Byte register 309; and
Exception Pointer Index register 303.

The Control block performs the following functions:
it repeatedly reads instructions from the Type Memory 310 indexed by the Type Pointer index register 301, and can perform various operations based on the instruction code, operand and current values of registers and memory;
it may fetch and store the contents of the various registers as shown and fetch and store the contents of the type memory, stack memory and memory store using the various registers and arithmetic unit to compute addresses; and
the comparison unit of the control block can compare the various registers and contents of the memory store and set the condition register to indicate a TRUE or FALSE value.

The Control block thus implements a state machine or virtual machine, which transitions between states based on the instructions from Type Memory which are executed during the control flow of a protocol decoding program.

The Type Memory 310 is prepared in advance with a sequence of type instructions defining a protocol decoding program according to the protocol to be decoded. The other variables are initialized at the beginning of processing of a datastream to 0 (false) except for Current Limit register 305 which is initialized to a number indicative of infinity.

Each location in the Type Memory 310 is comprised of a pair of one of the following type codes plus a parameter (or operand). The parameter is an integer value; for some type codes the parameter is not used and is zero. The set of types can be extended to cover additional concrete types and pseudo types. Table 1 below provides summary of type instruction names along with corresponding descriptions.

TABLE 1

Summary of Type Instruction Names and Description

| TypeName | Code (hex) | Concrete/ Pseudo | Parameter | Meaning |
|---|---|---|---|---|
| BYTE | 01 | concrete | None | |
| INT2 | 02 | concrete | None | |
| INT4 | 03 | concrete | None | |
| STRUCT | 04 | concrete | Type address | Go to struct |
| BYTESCAN | 05 | concrete | Byte (V) | Read to byte V |
| BLOB | 06 | concrete | Length (->X) | Read X bytes |
| JUMP | 11 | pseudo | Type address | TP := addr |
| BF | 12 | pseudo | Type address | TP := V if !C |
| BT | 13 | pseudo | Type address | TP := V if C |
| LIMIT | 14 | pseudo | Position | Push limit |
| LIMIT_END | 15 | pseudo | none | Pop limit |
| TRY | 16 | pseudo | Type address | Catch address |
| ENDTRY | 17 | pseudo | none | |
| CATCH | 18 | pseudo | Type address | Try address |
| ENDCATCH | 19 | pseudo | none | |
| ERR | 1A | pseudo | code | Handle error |
| LOADI | 20 | pseudo | address | R := V |
| LOAD | 21 | pseudo | address | R := MS[V] |
| STORE | 22 | pseudo | address | MS[V] := R |
| ADD | 23 | pseudo | address | R += MS[V] |
| EQ | 24 | pseudo | address | C := R = MS[V] |
| LT | 25 | pseudo | address | C := R < MS[V] |
| GT | 26 | pseudo | address | C := R > MS[V] |
| NOT | 27 | pseudo | none | C := !C |
| NULL | 3F | pseudo | none | End of struct |

The Control Block 315 executes a program based on the instructions in Type Memory 310 and the data stream provided. A byte is repeatedly read from the data stream, and then at most one concrete type per input cycle is executed along with any number of pseudo types. Execution may also halt upon detecting and signaling an error condition.

Current Position 304 is advanced by one every time a byte is read. Current Limit 305 represents an end position marker that is not to be advanced past. Initially, Current Limit 305 is set to infinity.

By processing a LIMIT pseudo type, the machine stores the current value of Current Limit 305 on the top of the stack, and sets Current Limit 305 to a new value. When the machine processes a LIMIT_END pseudo type, Current Limit 305 is restored to the previous value saved on the stack.

By processing a STRUCT concrete type, the machine changes Type Pointer Index Register 301 so that the next instruction will be a different one, however the current value of Type Pointer Index Register 301 is saved onto the top of the Working Stack 311. When a NULL pseudo type is processed, the machine restores Type Pointer Index Register 301 to the value last saved on the stack.

The Working Stack 311 may contain either position values or addresses. It is necessary to be able to distinguish one from the other; one technique is for each stack entry to contain an indicator bit. An alternative technique is to store positions using two entries on the stack with a designated invalid address such as zero, for example, on the top.

When processing a TRY pseudo type, the machine saves the current value of Exception Pointer Index Register 303 on the top of the Working Stack 311. When processing a TRY_END pseudo type, the machine restores Exception Pointer Index Register 303 from the top of the stack.

If before the Control Block 315 attempts to read a byte from the data stream Current Position Register 304 is greater than or equal to Current Limit Register 305, then an exception handling sequence begins. Here, Exception Pointer Index Register 303, if not equal to zero, is the address set by the most recent TRY pseudo type to which control is directed, and it will be pre-arranged that at that address there is a CATCH pseudo type. In processing the CATCH pseudo type, entries are removed from the top of the Working Stack 311 until the entry which was pushed on by the nearest enclosing TRY is removed. If, as entries are removed, a limit value is removed, then Current Limit Register 305 is restored to this value. This has the effect of exiting from any number of STRUCTs or LIMITs for which a NULL or END_LIMIT has not been processed. Alternatively, if Current Position Register 304 is greater than or equal to Current Limit Register 305, but Exception Pointer Index Register 303 is zero, then the machine halts having detected a limit error condition.

Execution Environment Module 207 is also equipped with a number of arithmetic, comparison and branching operations that enable the programming of logical expressions and loops.

Figure 4:
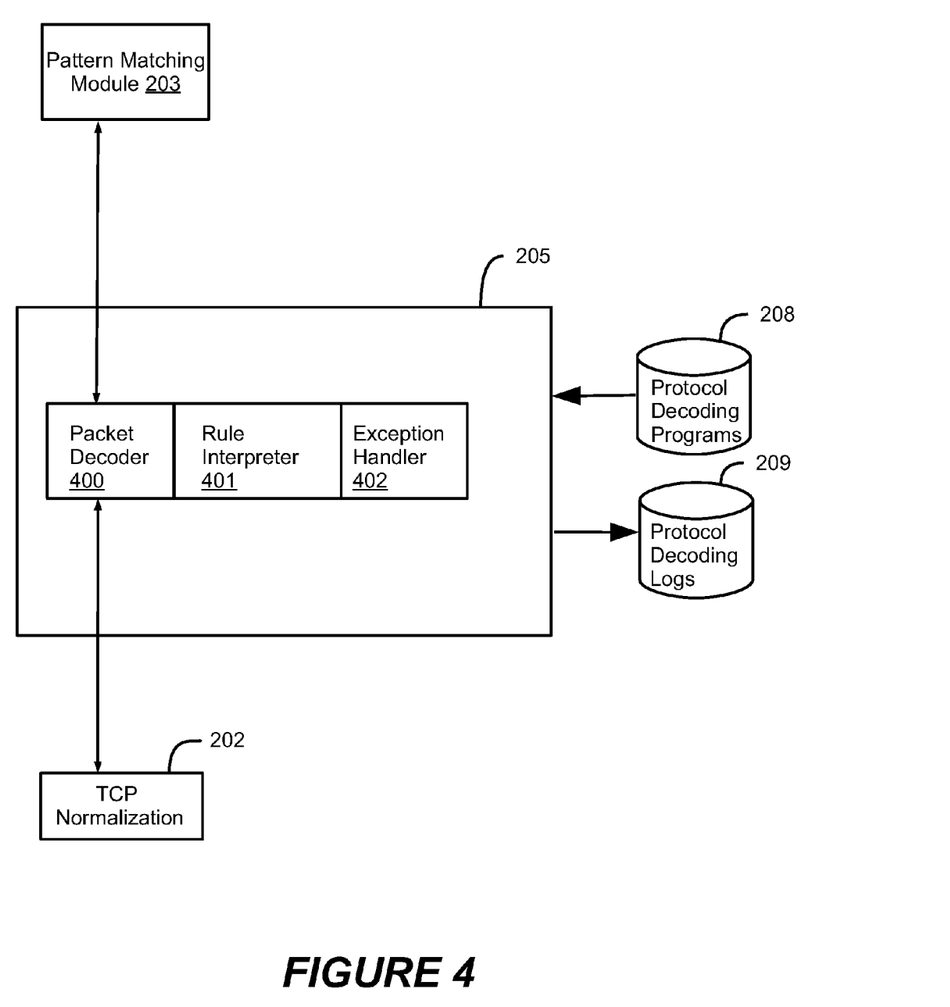
FIG. 4 illustrates the Protocol Decoding Module 205 of FIG. 2 in more detail.

FIG. 4 shows the Protocol Decoding Module 205 of FIG. 2 in more detail. The Protocol Decoding Module 205 comprises the following modules:

Packet Decoder 400 uses the instructions in the protocol decoding program to examine the content of data packets in a detailed sequential manner.

Rule Interpreter 401 maintains a mapping of rule names to rule instructions. Whenever a rule is triggered by a data pattern, a signaled event, or a counter, the corresponding rule instructions for the triggered rule are executed.

Exception Handler 402 supports structured exception handling in protocol decoding programs, as described previously in FIG. 3. For example, the range of a byte value in a data packet could be checked as follows:

```
<try>
    <int min="1" max="2"/>
    <byte/>
<catch>
    signal "bad:int"
</catch>
</try>
```

Figure 5:
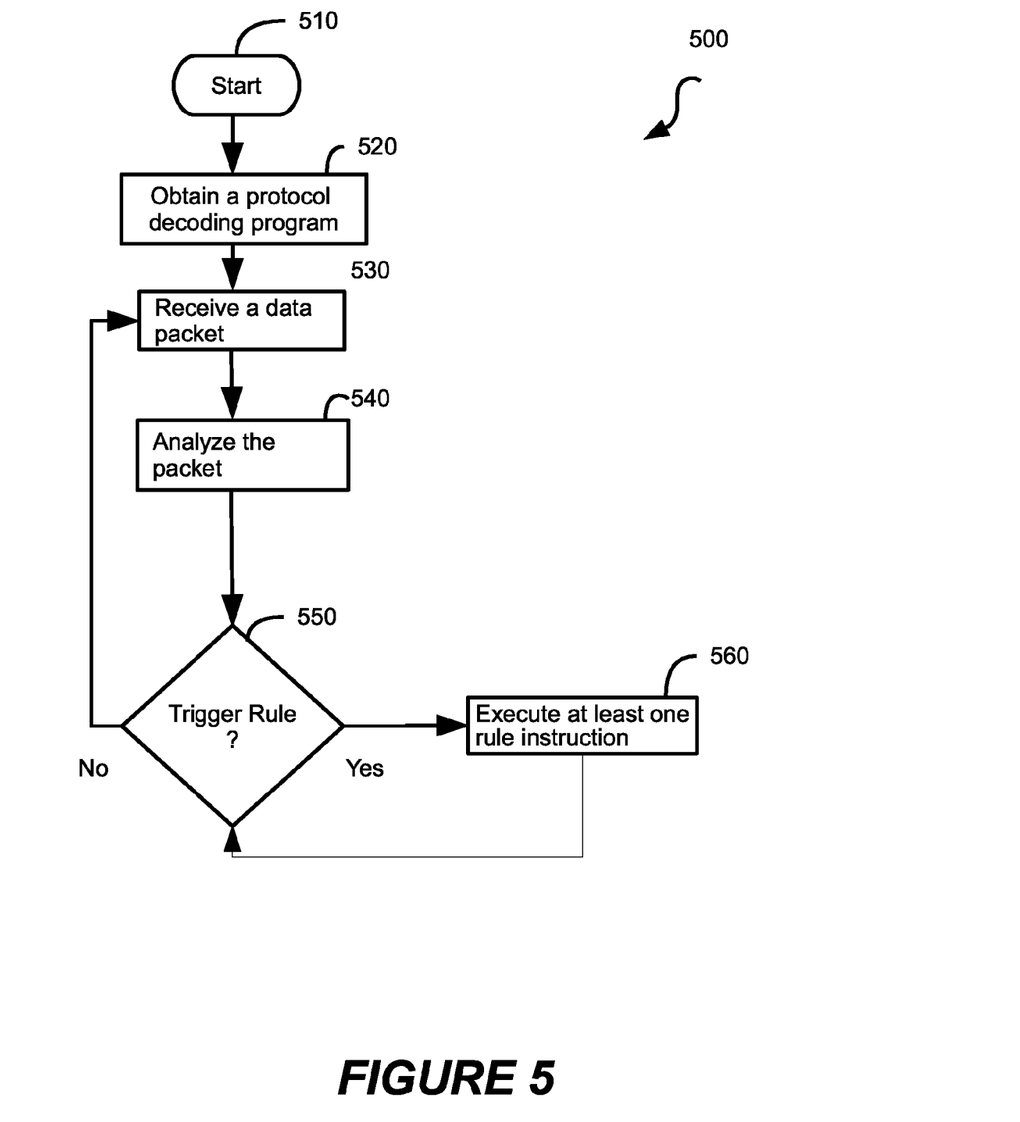
FIG. 5 shows a flow chart 500 illustrating operation of the Protocol Decoding Module.

FIG. 5 shows a flow chart 500 illustrating operation of the Protocol Decoding Module. At step 510 the operation begins, and at step 520 a protocol decoding program is obtained. This may be achieved in the embodiments of the invention using an initialization rule, which is a method of executing instructions prior to the first byte of data to be processed, however any suitable method may be used to obtain a desired program. Whichever method is used, the protocol decoding program is loaded into the Type Memory of the Execution Environment Module. At step 530, a data packet is received. As described previously, preferably this data packet has been normalized in the context of the other packets received for the same connection. At step 540, the packet is analyzed by the Protocol Decoding Module using the Execution Environment Module as outlined in FIG. 3. At step 550, a determination is made if any rules should be triggered based on step 540. If a rule should be triggered, the corresponding rule instructions are located by the Rule Interpreter and executed in step 560. More than one rule may be triggered. If no rule is to be triggered, or all appropriate rules have been triggered, operation continues with step 530 and a subsequent data packet is processed.

Figure 6:
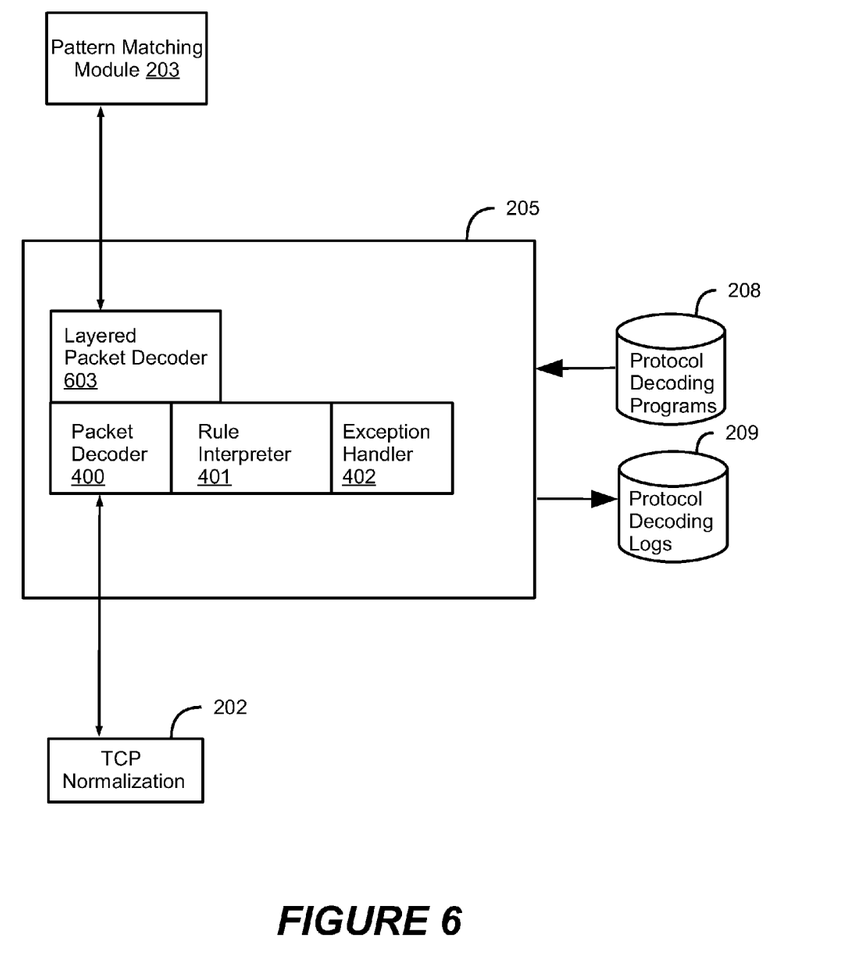
FIG. 6 shows an expanded block diagram of the Protocol Decoding Module according to an alternate embodiment of the invention.

FIG. 6 shows an expanded block diagram of the Protocol Decoding Module according to an alternate embodiment of the invention. To assist in decoding data which has been compressed or encoded within a data protocol, Layered Packet Decoder 603 is added in this embodiment. Upon detecting that some portion of data is compressed or encoded, Packet Decoder 400 passes this portion to Layered Packet Decoder 603, where it is decompressed or decoded. The decompressed or decoded data can then be processed by Pattern Matching Module 203.

Figure 7:
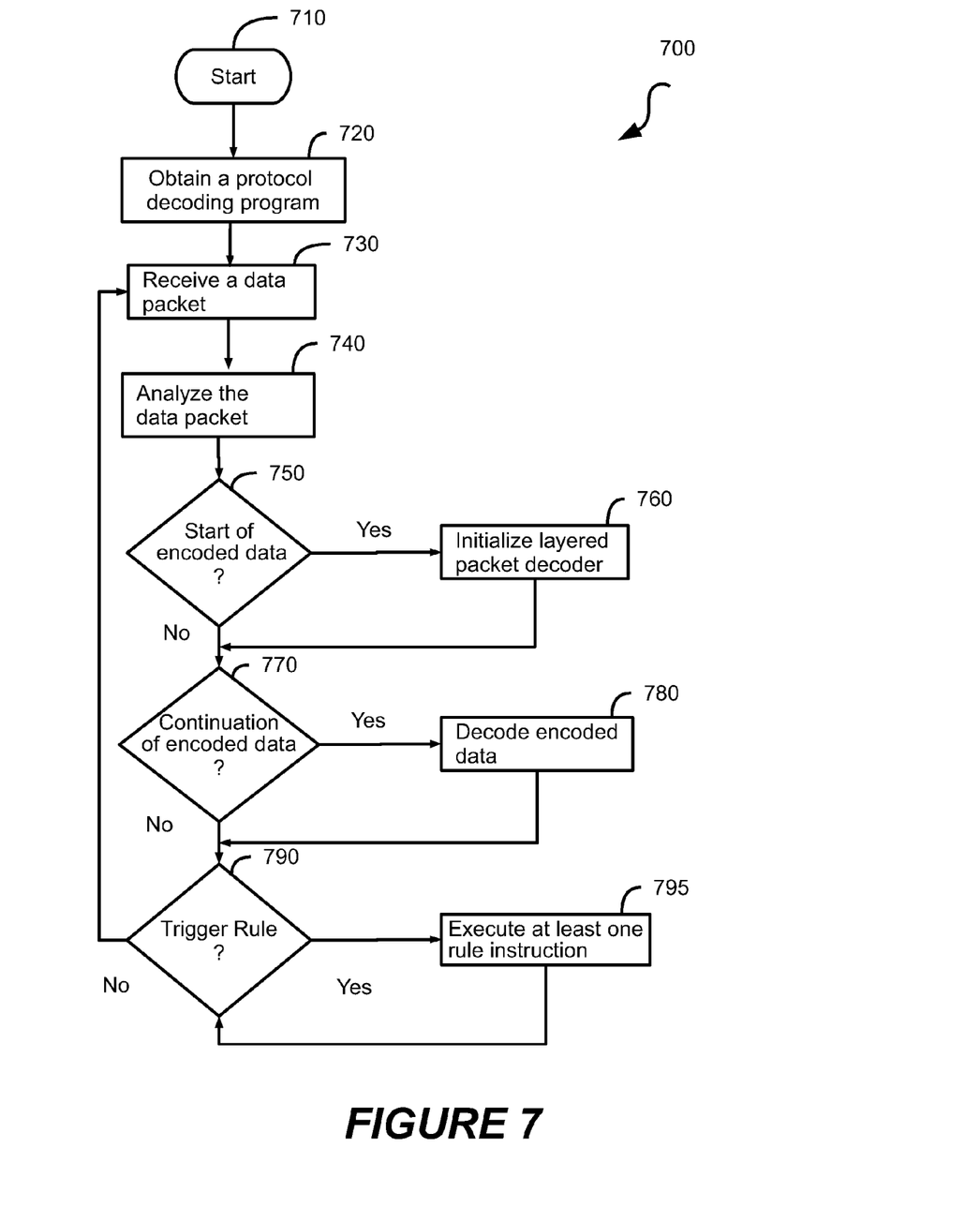
FIG. 7 shows a flow chart 700 illustrating operation of the Protocol Decoding Module of FIG. 6 according to an alternate embodiment of the invention.

FIG. 7 shows a flow chart 700 illustrating operation of the Protocol Decoding FIG. Module of FIG. 6 according to an alternate embodiment of the invention. At step 710 the operation begins, and at step 720 a protocol decoding program is obtained. At step 730, a data packet is received. Preferably this data packet has been normalized in the context of the other packets received for the same connection. At step 740, the packet is analyzed by the Protocol Decoding Module using the Execution Environment Module as outlined in FIG. 3. At step 750, the Protocol Decoding module determines if a region of compressed or encoded data is indicated by the analysis of the protocol data. This may be determined for example, based on a sentinel value or string in the data, or a header indicating a section of data will follow that is compressed or encoded, or any other method used in a data protocol to indicate a compressed or encoded portion of data. At step 760, a Layered Packet Decoder is initialized if needed. In this embodiment, preferably there are several different Layered Packet Decoders available, one for each type of encoding that will be supported. At step 770, the Protocol Decoding module determines if the data in the data packet is a continuation of encoded data. If so, the data is decoded at step 780 by the Layered Packet Decoder. At step 790, a determination is made if any rules should be triggered based on the preceding steps. If a rule should be triggered, the corresponding rule instructions are located by the Rule Interpreter and executed in step 795. More than one rule may be triggered. If no rule is to be triggered, or all appropriate rules have been triggered, operation continues with step 730 and a subsequent data packet is processed.

Although the various methods described above are conveniently carried out on a general purpose computer, one of ordinary skill in the art would recognize that such methods may be carried out in hardware, in firmware, or in a more specialized apparatus constructed to perform the required steps. The type of computer network used may be a version of Internet Protocol (IP) network, or any other appropriate packet network. While a single computer network was shown, multiple computer networks may also be supported. While the embodiments of the invention have been demonstrated to analyze packet data received from a computer network, one of ordinary skill in the art would recognize that the same techniques may be equally applied to analyze file data, or any sequence of bytes or characters.

Thus, an improved method and system for dynamic protocol decoding and analysis has been provided.

The computer system of the embodiments of the invention comprises a computer having a processor and a memory, storing computer code instructions, which, when executed, perform the steps of the methods described above. Sub-sets of the computer code instructions stored in the memory form respective modules and means of the computer system, which provide corresponding functionality for the system as described in detail in the section "detailed description of the embodiments of the invention" below.

A computer readable medium is also provided, such a CD-ROM, DVD, floppy, non-volatile memory or the like, storing computer code instructions, which, when executed, perform the steps of the methods described above, or form corresponding computer system module or means described above.

The present invention provides the following advantages. It addresses the problem of detecting anomalous or malicious data traffic which may have been compressed or encoded by an intruder to conceal its intent. In addition, the present invention provides a system for executing a protocol decoding program which will generate fewer false positive notifications than the prior art because the system can search for data patterns in defined regions of data packets, dictated by the protocol in use. Further, the protocol decoding language and execution environment of the invention provides a convenient method for expressing limits or boundaries in processing protocols, so that anomalous data can be detected and appropriate action can be taken.

Although the embodiments of the invention have been described in detail, it will be apparent to one skilled in the art that variations and modifications to the embodiments may be made within the scope of the following claims.

What is claimed is:

1. A method for inspecting a data stream, comprising data packets, in a computer system in a computer network, the method comprising:
   using a hardware processor for:
   (a) detecting an encoded portion of the data stream, which is encoded according to an encoding method;
   (b) decoding the encoded portion of the data stream into a decoded data stream; and
   (c) executing a protocol decoding program comprising a sequence of protocol decoding instructions, to inspect the decoded data stream, comprising:
   normalizing data packets in the decoded data stream;
   (i) executing a concrete type instruction from at least two types of concrete type instructions, each type of the concrete type instructions defining a different length of a data unit of a normalized data packet in the decoded data stream, and causing reading a data unit according to the length defined by a number of bytes by the concrete type instruction being executed as a parameter of the concrete type instruction;
   (ii) executing a pseudo type instruction of a first type, comprising analyzing data contained in the data unit read by the concrete type instructions;
   (iii) executing a pseudo type instruction of a second type for controlling a program flow of the protocol decoding program by jumping to a protocol decoding instruction in the sequence of protocol decoding instructions as a function of the data contained in the data unit;
   (iv) provided the data contained in said data unit satisfies a predefined condition, terminating the protocol decoding program, otherwise executing a next protocol decoding instruction in the sequence of protocol decoding instructions; and
   (v) provided anomalous data is detected in the decoded data stream, sending a notification to a security center regarding inspected decoded data stream, and if required, receiving a security configuration and security recommendations from the security center.

2. The method of claim 1, wherein the length of the data unit defined by the concrete type instruction is a predefined fixed number of bytes, which is a function of said any of the concrete type instructions.

3. The method of claim 1, wherein the number of bytes to be read in the step (i) is defined by a parameter of the concrete type instruction being executed, the parameter having a predetermined value.

4. The method of claim 1, wherein the number of bytes to be read in the step (i) is defined by a parameter of the concrete type instruction being executed, wherein the parameter is determined by a pseudo type instruction executed prior to the executing the concrete type instruction.

5. The method of claim 1, wherein the number of bytes to be read in the step (i) is dynamically defined by the concrete type instruction being executed as a number of bytes read until a terminating byte value is encountered in the data packet, the terminating byte value being defined by a parameter of the concrete type instruction.

6. The method of claim 1, wherein the step (iv) further comprises triggering a rule of the protocol decoding program provided the predefined condition regarding the data unit read in the step (i) is met.

7. The method of claim 6, further comprising executing a corresponding rule instruction associated with the rule triggered in the step (iv).

8. The method of claim 1, wherein the step (iv) comprises at least one of the following:
   generating an exception according to an exception handling mechanism;
   terminating the protocol decoding program provided a predefined length of the data packet or the data unit is exceeded; and
   triggering a rule provided the predefined condition comprises finding a predetermined data pattern in the data unit read in the step (i).

9. The method of claim 1, wherein the step (ii) further comprises changing the data packet.

10. The method of claim 1, wherein the step (b) comprises terminating the decoding when a length of the decoded data stream exceeds a predetermined limit.

11. The method of claim 1, further comprising recovering the protocol decoding program upon encountering an error.

12. The method of claim 1, wherein:
   the data packet is configured in accordance with a multi-layered protocol; and
   the analyzing data contained in the data unit comprises providing a plurality of state machines, each state machine processing data units of a corresponding layer of the data packet.

13. A system for inspecting a data stream, comprising data packets, in a computer system in a computer network, the system comprising:
   a processor;
   a memory device having computer readable instructions stored thereon for execution by the processor, the computer readable instructions forming a protocol decoding program comprising a sequence of protocol decoding instructions, causing the processor to:
   (a) detect an encoded portion of the data stream, which is encoded according to an encoding method;
   (b) decode the encoded portion of the data stream into a decoded data stream; and
   (c) execute the protocol decoding program, to inspect the decoded data stream, comprising:
      normalizing data packets in the decoded data stream;
      (i) executing a concrete type instruction from at least two types of concrete type instructions, each type of the concrete type instructions defining a different length of a data unit of a normalized data packet in the decoded data stream, and causing reading a data unit according to the length defined by a number of bytes by the concrete type instruction being executed as a parameter of the concrete type instruction;
      (ii) executing a pseudo type instruction of a first type, comprising analyzing data contained in the data unit read by the concrete type instructions;
      (iii) executing a pseudo type instruction of a second type for controlling a program flow of the protocol decoding program by jumping to a protocol decoding instruction in the sequence of protocol decoding instructions as a function of the data contained in the data unit;
      (iv) provided the data contained in said data unit satisfies a predefined condition, terminating the protocol decoding program, otherwise executing a next protocol decoding instruction in the sequence of protocol decoding instructions; and
      (v) provided anomalous data is detected in the decoded data stream, sending a notification to a security center regarding inspected decoded data stream, and if required, receiving a security configuration and security recommendations from the security center.

14. The system of claim 13, wherein the length of the data unit defined by the concrete type instruction is a predefined fixed number of bytes, which is a function of said any of the concrete type instructions.

15. The system of claim 13, wherein the number of bytes to be read is defined by a parameter of the concrete type instruction being executed, the parameter having a predetermined value.

16. The system of claim 13, wherein the number of bytes to be read is defined by a parameter of the concrete type instruction being executed, wherein the parameter determined by a pseudo type instruction executed prior to the executing the concrete type instruction.

17. The system of claim 13, wherein the number of bytes to be read is dynamically defined by the concrete type instruction being executed as a number of bytes read until a terminating byte value is encountered in the data packet, the terminating byte value being defined by a parameter of the concrete type instruction.

18. The system of claim 13, wherein the computer readable instructions further cause the processor to trigger a rule of the protocol decoding program provided the predefined condition regarding the data unit is met.

19. The system of claim 16, wherein the computer readable instructions further cause the processor to execute a corresponding rule instruction associated with the rule being triggered.

20. The system of claim 13, wherein the computer readable instructions further cause the processor to perform one of the following:
   generate an exception according to an exception handling mechanism;
   terminate the protocol decoding program provided a predefined length of the data packet or the data unit is exceeded; and
   trigger a rule provided the predefined condition comprises finding a predetermined data pattern in the data unit that has been read.

21. The system of claim 13, wherein the computer readable instructions further cause the processor to terminate the decoding when a length of the decoded data stream exceeds a predetermined limit.

22. The system of claim 13, wherein the data packet is configured in accordance with a multi-layered protocol; the system being further configured to analyze data contained in the data unit by a plurality of state machines, each state machine being configured to process data units of a corresponding layer of the data packet.

* * * * *